G. R. KIDDER.

Door Hanger.

No. 9,782. Reissued June 28, 1881.

*Witnesses:* a. H. Norris

J. A. Rutherford

*Inventor:*

George R. Kidder,

By Geo. H. Lothrop.

*Attorney.*

N. PETERS, Photo-Lithographer, Washington, D. C.

UNITED STATES PATENT OFFICE.

GEORGE R. KIDDER, OF ARMADA, MICHIGAN.

DOOR-HANGER.

SPECIFICATION forming part of Reissued Letters Patent No. 9,782, dated June 28, 1881.

Original No. 230,785, dated August 3, 1880. Application for reissue filed December 20, 1880.

*To all whom it may concern:*

Be it known that I, GEORGE R. KIDDER, a citizen of the United States, residing at Armada, in the county of Macomb and State of Michigan, have invented certain new and useful Improvements in Hangers for Sliding Doors, of which the following is a specification.

This invention relates to improvements in hangers for sliding doors which support the door at the upper edge on an elevated trackway.

The object of my invention is to provide means for hanging such doors, whereby the parts can be readily and conveniently adjusted in proper relative position, and whereby the sliding movements of the door cannot be impeded by warping of the track or of the door.

To these ends my invention consists in the construction and arrangement of parts specifically pointed out in the appended claims.

Figure 1:
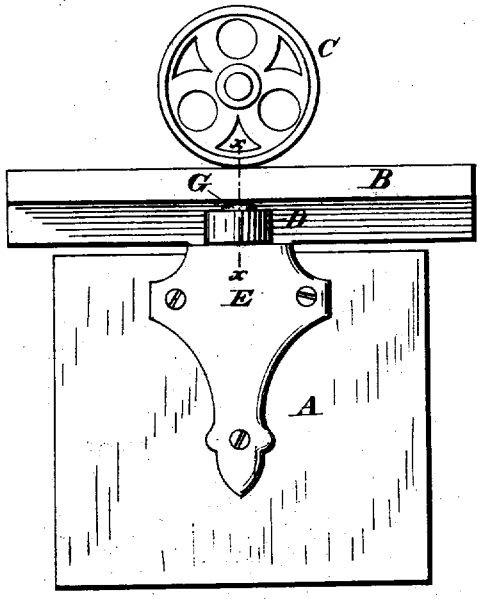
Figure 2:
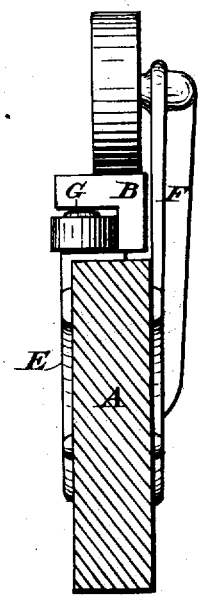
Figure 3:
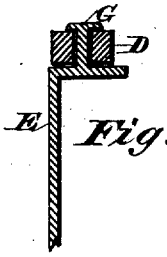

In the accompanying drawings, Figure 1 represents a side view of a sliding door provided with my invention; Fig. 2, an end view thereof, and Fig. 3 a sectional view on the line *x x* of Fig. 1.

The letter A indicates a portion of the sliding door, and B the elevated trackway, which is provided with a perfectly flat and plain tread or upper face and a longitudinal grooved guideway in its under side.

The letter F indicates a hanger, which is attached to the upper edge of the door, and is provided with a bearing-wheel, C, which is journaled on an axle or arbor on the upper end of the hanger, so that said bearing-wheel C rotates in a vertical plane at one side of the hanger. This bearing-wheel is provided with a plain face, and it rests upon the plain-faced surface of the trackway.

The letter E indicates the independent bracket, which is attached to the inside surface of the door at the upper edge thereof, and is furnished with an upwardly-projecting guide, consisting, as shown, of a vertical stud, G, which prevents vertical displacement of the hanger, and a loose friction-roller, H, on said stud, which prevents lateral displacement of the hanger, said guide being arranged to travel in the grooved guideway on the under side of the track. By means of this independent bracket, provided with an upwardly-extending stud and anti-friction roller, the door is accurately guided in its sliding movements and vertical and lateral displacement of the bearing-wheel is entirely prevented, while the door is capable of freely sliding without liability of the parts binding or becoming difficult to operate should the track or the door become warped.

The upper end of the stud G of the guide on the independent bracket is rounded so as to avoid unnecessary friction, and this stud prevents vertical displacement of the bearing-wheel by coming in contact with the top wall of the grooved guideway; and the friction-roller D, Fig. 2, is arranged so as to project beyond the outer surface of the bracket E, for the purpose of bearing against the wall of the building on which the door is hung, thereby preventing the door from rubbing or binding against the said wall.

An important advantage arises from constructing the bracket E separate from and independent of the hanger F, in that the bracket can be adjusted in position while the door is suspended from the track, thereby permitting the guide to be accurately adjusted in place in the grooved guideway.

What I claim is—

1. In a sliding door suspended from its upper end, the combination of the following elements—namely: the vertical hanger attached to the upper end of the door and provided with the vertical plain-faced rotating bearing-wheel, the elevated track, constructed with the longitudinal grooved guideway on its under side, and an independently-attachable bracket attached to the inner side of the door opposite the hanger, and provided with a guide to prevent vertical displacement of the hanger, said guide projecting upwardly into the grooved guideway of the elevated track, all substantially as herein described.

2. The combination of the hanger, having a single plain-faced bearing-wheel adapted to be attached to the outer side of a door, and an independent bracket adapted to be attached to the inner side of a door, and having a guide to prevent vertical displacement of the hanger, said guide projecting vertically from the upper portion of the bracket, substantially as described.

3. The combination of the hanger F and bearing-wheel C with the track B, door A, bracket E, and a guide on the bracket, consisting of the arm G and roller D, substantially as shown and described.

4. In combination, with a sliding door and hanger, the bracket E, secured to the inside of the door, and having on its upper end a guide consisting of an arm or stud, G, and the friction-roller D, substantially as described.

GEO. R. KIDDER.

Witnesses:
B. J. FLENNERFELT,
GEO. H. CARLISLE.